(12) United States Patent
Acharya et al.

(10) Patent No.: US 6,551,728 B1
(45) Date of Patent: Apr. 22, 2003

(54) MAGNETIC RECORDING MEDIUM AND MAGNETIC STORAGE APPARATUS

(75) Inventors: B. Ramamurthy Acharya, Kawasaki (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/539,944

(22) Filed: Mar. 31, 2000

(30) Foreign Application Priority Data

Sep. 30, 1999 (JP) .......................................... 11-279942

(51) Int. Cl.[7] .............................. A11B 5/66; A11B 5/70
(52) U.S. Cl. .............................. 428/694 TS; 428/212; 428/213; 428/336; 428/611; 428/694 TM; 428/900
(58) Field of Search ................ 428/694 TS, 694 TM, 428/900, 336, 694 MM, 212, 213, 611

(56) References Cited

U.S. PATENT DOCUMENTS

| | | | |
|---|---|---|---|
| 5,665,468 A | * 9/1997 | Sekiya et al. | 428/332 |
| 5,820,963 A | 10/1998 | Lu et al. | 428/65.3 |
| 5,922,442 A | 7/1999 | Lal et al. | 428/216 |
| 5,966,348 A | * 10/1999 | Hashimoto et al. | 369/13 |
| 5,976,688 A | * 11/1999 | Kawase et al. | 428/332 |
| 6,197,440 B1 | * 3/2001 | Shiratori | 428/694 SC |

OTHER PUBLICATIONS

Okijima et al.; "Effect of CoCr Interlayer on Longitudinal Recording"; *IEEE Transactions on Magnetics*, vol. 33, No. 5; Sep. 1997.

M.P. Sharrock; "Time Dependence of Switching Fields in Magnetic Recording Media (Invited)"; *J. Appl. Phys.*, vol. 76, No. 10; Nov. 15, 1994.

* cited by examiner

*Primary Examiner*—Holly Rickman
(74) *Attorney, Agent, or Firm*—Greer, Burns & Crain, Ltd.

(57) ABSTRACT

A magnetic recording medium is constructed to include a non-magnetic underlayer, and a magnetic layer including a compensation layer provided on the nonmagnetic underlayer, and a recording layer provided on the compensation layer, where the compensation layer has a thickness of 3 to 15 nm and is made of Co or a Co alloy with a Curie temperature of approximately 30 to 150° C., and the recording layer has a thickness of 10 to 30 nm and is made of a Co alloy with a Curie temperature of approximately 250 to 800° C.

17 Claims, 19 Drawing Sheets

| | Ku erg/cc | KuV/kT | Ms amu/cc | Hk Oe | Hc Oe | ΔKu | KuV/kT | ΔMs | Hk Oe | Hc Oe | dHc/dT Oe/100°C |
|---|---|---|---|---|---|---|---|---|---|---|---|
| 12 nm | 4.50E+06 | 102 | 810 | 11111 | | 20% | | 4% | | | |
| 6 nm | 0 | 0 | 180 | 0 | 0 | 0% | | 180.00% | | | |
| 合計 -10 nm | 3.00E+06 | 102 | 600 | 10000 | 3200 | 20% | 61.2 | 14.00% | 9300 | 2370 | 828 |

MAGNETIC RECORDING MEDIUM AND MAGNETIC STORAGE APPARATUS

BACKGROUND OF THE INVENTION

1. Field of the Invention

The present invention generally relates to magnetic recording mediums and magnetic storage apparatuses, and more particularly to a magnetic recording medium and a magnetic storage apparatus which are suited for high-density recording.

2. Description of the Related Art

The recording density of longitudinal magnetic recording media, such as magnetic disks, has been increased considerably, due to the reduction of media noise and the development of magnetoresistive and high-sensitivity spin-valve heads. Recording densities above 20 $Gb/in^2$ have recently been demonstrated for the magnetic disks. The demand for greater recording densities for better performing computers is however showing an increasing trend imposing greater challenges for the recording media and other component design.

FIG. 1 is a cross sectional view showing an important part of a typical longitudinal magnetic recording medium. The magnetic recording medium is comprised of a substrate 1, a Cr or Cr-based underlayer 2, a Co-based magnetic layer 3 where information is written, and a C or DLC overlayer 4 which are stacked as shown in FIG. 1. An organic lubricant is coated on the overlayer 4.

Lowering the medium noise involves writing sharper magnetic transitions in the magnetic layer 3. This is generally achieved by increasing the media coercivity, decreasing the thickness of the magnetic layer 3, decreasing the grain size and grain size distribution of the magnetic layer 3, and magnetically isolating the grains of the magnetic layer 3. However, as the grains of the magnetic layer 3 are made smaller and magnetically isolated, the magnetic recording medium is exposed to several thermally related obstacles.

One of the thermally related obstacles is the increase in the temperature coefficient of coercivity or, a large spread in the coercivity within the operating temperature range of the magnetic recording medium. In the case of a hard disk drive, the operating temperature range is normally 5 to 65° C., but is 0 to 100° C. in extreme cases.

The media thickness has been decreasing over the years in order to achieve higher recording densities. Such a decrease in the media thickness was necessary to lower the media noise. Hence, with this trend, the media thickness requirement could be less than 15 nm for a magnetic recording medium having the recording density of 40 $Gb/in^2$.

However, as shown in FIG. 2, the coercivity of the magnetic recording medium shows a large spread over the operating temperature range as the media thickness decreases. For a magnetic recording medium having a media thickness of 13 nm, the coercivity changes by about 1400 Oe for a temperature change of 0 to 100° C. This large spread of the coercivity over the operating temperature range puts severe limitations on the media design. In other words, the overwrite performance deteriorates at low temperatures, and the media noise increases at high temperatures.

One of the requirements for achieving the high-density recording is to employ a high media coercivity. However, a large write current is required in order to write information on a magnetic recording medium having the high media coercivity. Write currents which can be produced by existing write heads are severely limited for the media coercivities higher than 3000 Oe, because the development of high magnetic moment write heads has been slow.

The difficulty in writing the information on the magnetic recording medium having the high media coercivity is normally referred to in terms of the overwrite performance. A large variation of the coercivity leads to a higher coercivity at lower temperatures of 0 to 5° C., for example, thereby making it more difficult to obtain a satisfactory overwrite performance. The magnetic recording mediums having the recording densities above 20 $Gb/in^2$ are expected to have severe overwrite requirements, and any decrease in the overwrite performance at the lower temperatures will result in a major limitation for designing high-performance magnetic recording media.

Furthermore, a large variation of the coercivity also leads to a lower coercivity at higher temperatures. This decrease in the coercivity will lead to increased media noise, that is, a decrease in media signal-to-noise ratio (SNR). FIG. 3 is a diagram showing a trend in decreasing media SNR with decreasing coercivity. A variation of the coercivity over 1000 Oe per 100° C. (1000 Oe/100° C.) limits the design of the magnetic recording medium in terms of non-uniform media SNR over the operating temperature range.

As described above, it is desirable to reduce the coercivity spread over the operating temperature range of the magnetic recording medium. However, on the contrary, there was a problem in that physical considerations of the high-density magnetic recording media result in increasing the coercivity spread over the operating temperature range of the magnetic recording media.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and magnetic storage apparatus which have a small temperature coefficient of coercivity and low media noise over a relatively wide operating temperature range.

Still another object of the present invention is to provide a magnetic recording medium comprising a non-magnetic underlayer, and a magnetic layer including a compensation layer provided on said non-magnetic underlayer, and a recording layer provided on the compensation layer, where the compensation layer has a thickness of 3 to 15 nm and is made of Co or a Co-based alloy with a Curie temperature of approximately 30 to 150° C., and the recording layer has a thickness of 10 to 30 nm and is made of a Co-based alloy with a Curie temperature of approximately 250 to 800° C. According to the magnetic recording medium of the present invention, it is possible to realize a magnetic recording medium having a small temperature coefficient of coercivity and low media noise over a relatively wide operating temperature range.

A further object of the present invention is to provide a magnetic recording medium comprising a non-magnetic underlayer, and a magnetic layer including a first compensation layer provided on the non-magnetic underlayer, a second compensation layer provided on the first compensation layer and a recording layer provided on the second compensation layer, where the first compensation layer has a thickness of 1 to 5 nm and is made of Co or a Co-based alloy with a Curie temperature of approximately 0 to 50° C., the second compensation layer has a thickness of 3 to 15 nm and is made of Co or a Co-based alloy with a Curie temperature of approximately 30 to 150° C., and the recording layer has a thickness of 10 to 30 nm and is made of a Co-based alloy with a Curie temperature of approximately 250 to 800° C. According to the magnetic recording medium of the present invention, it is possible to realize a magnetic recording medium having a small temperature coefficient of coercivity and low media noise over a relatively wide operating temperature range.

Another object of the present invention is to provide a magnetic storage apparatus comprising at least one magnetic recording medium having at least a non-magnetic underlayer, and a magnetic layer which includes a compensation layer provided on the non-magnetic underlayer and a recording layer provided on the compensation layer, where the compensation layer has a thickness of 3 to 15 nm and is made of Co or a Co-based alloy with a Curie temperature of approximately 30 to 150° C., and the recording layer has a thickness of 10 to 30 nm and is made of a Co-based alloy with a Curie temperature of approximately 250 to 800° C. According to the magnetic storage apparatus of the present invention, it is possible to realize a magnetic storage apparatus having a small temperature coefficient of coercivity and low media noise over a relatively wide operating temperature range.

Still another object of the present invention is to provide a magnetic storage apparatus comprising at least one magnetic recording medium having at least a non-magnetic underlayer, and a magnetic layer which includes a first compensation layer provided on the non-magnetic underlayer, a second compensation layer provided on the first compensation layer and a recording layer provided on the second compensation layer, where the first compensation layer has a thickness of 1 to 5 nm and is made of Co or a Co-based alloy with a Curie temperature of approximately 0 to 50° C., the second compensation layer has a thickness of 3 to 15 nm and is made of Co or a Co-based alloy with a Curie temperature of approximately 30 to 150° C., and the recording layer has a thickness of 10 to 30 nm and is made of a Co-based alloy with a Curie temperature of approximately 250 to 800° C. According to the magnetic storage apparatus of the present invention, it is possible to realize a magnetic storage apparatus having a small temperature coefficient of coercivity and low media noise over a relatively wide operating temperature range.

Other objects and further features of the present invention may be apparent from the following detailed description when read in conjunction with the accompanying drawings.

DESCRIPTION OF THE PREFERRED EMBODIMENTS

A description will hereinafter be given of embodiments of the magnetic recording medium and magnetic storage apparatus according to the present invention, by referring to FIG. 4 and the subsequent drawings.

Figure 4:
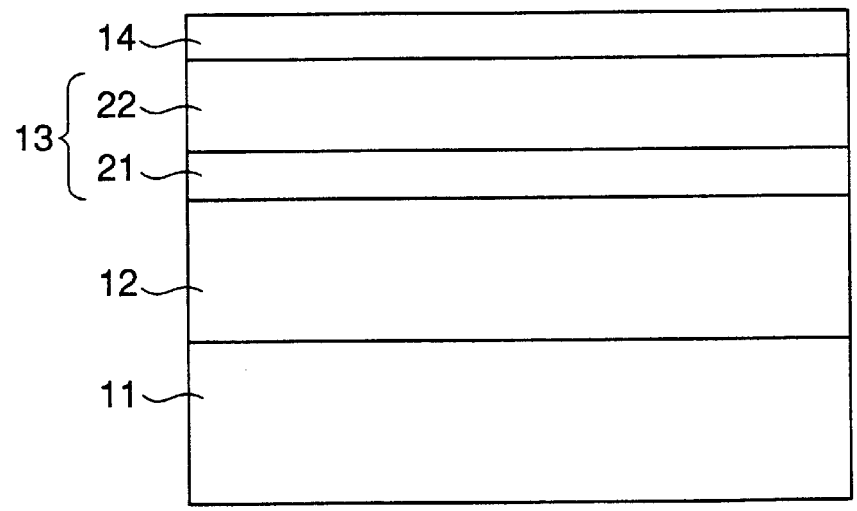
FIG. 4 is a cross sectional view showing an important part of a first embodiment of a magnetic recording medium according to the present invention.

FIG. 4 is a cross sectional view showing an important part of a first embodiment of a magnetic recording medium according to the present invention. The magnetic recording medium is comprised of a substrate 11, a Cr or Cr-based underlayer 12, a Co-based magnetic layer 13 where information is written, and a C or DLC overlayer 14 which are stacked as shown in FIG. 4. An organic lubricant is coated on the overlayer 14. In this embodiment, the magnetic layer 13 has a bi-layer structure including a compensation layer 21 and a recording layer 22 which is provided on the compensation layer 21.

The compensation layer 21 has a Curie temperature Tc of approximately 30 to 150° C., and has a magnetization Ms which sharply decreases near the Curie temperature Tc. Because the Curie temperature Tc of the compensation layer 21 is near to room temperature, a magnetic anisotropy constant Ku for the compensation layer 21 is negligibly small.

The compensation layer 21 having the Curie temperature Tc near to the room temperature can be formed using a CoCr alloy. For example, a CoCr film with a Cr concentration of 35 to 40% has a Curie temperature Tc near to the room temperature, as shown by S. Ohkijima et al., "Effect of CoCr Interlayer on Longitudinal Recording", I.E.E.E. Trans. Magn., 35(5), p.2944, 1997. The Cr concentration of the CoCr film needed to obtain the Curie temperature Tc near to the room temperature may differ depending on the Cr segregation to the grain boundary. Such segregation depends on fabrication parameters, underlayers, alloying elements and the like of the CoCr film.

In this embodiment, the compensation layer 21 has a thickness of 3 to 15 nm, and is made of Co or a Co-based alloy such as CoCr, CoCrTa, CoCrPt, CoCrW, CoCrB, CoCrPtTa, CoCrPtB, CoCrPtW, CoCrPtTaB and CoCrPtTaNb which include 60 to 80 atomic percent (at. %) of Co and 20 to 40 at. % of Cr or other elements.

On the other hand, the recording layer 22 has a Curie temperature Tc of approximately 250 to 800° C., a thickness of 10 to 30 nm, and is made of a Co-based alloy such as CoCr, CoCrPt, CoCrTa, CoCrPtW, CoCrPtTa, CoCrPtB, CoCrPtTaB and CoCrPtTaNb which have an axis of easy magnetization substantially parallel to a film plane of the compensation layer 21 on which the recording layer 22 is provided. The recording layer 22 has a high magnetic anisotropy constant Ku, a high magnetization Ms, and a high Curie temperature Tc.

The recording layer 22 having the necessary magnetic anisotropy constant Ku and magnetization Ms may be fabricated using a Co-based alloy in which concentrations of Co and other metal elements determine the magnetic anisotropy constant Ku and the magnetization Ms.

Because the compensation layer 21 and the recording layer 22 are magnetically coupled, an effective magnetic anisotropy constant Ku and an effective magnetization Ms for the magnetic layer 13 having the bi-layer structure respectively are lower than those of the recording layer 22.

The substrate 11 used in this embodiment may be made of an Al-based alloy coated with NiP, glass with or without NiP coating, Si, SiC or the like. On the other hand, the underlayer 12 may be made of non-magnetic NiAl, FeAl, Cr, a Cr-based alloy such as CrMo, CrTi, CrV and CrW, or an alloy with a B2 structure. For example, the underlayer 12 has a thickness of 5 to 30 nm.

In a modification of this embodiment, the underlayer 12 may be made of NiAl or other B2 structure with or without an additional underlayer of Cr or a Cr-based alloy. Furthermore, an intermediate layer made of a CoCr alloy and having a thickness of 1 to 5 nm may additionally be provided between the underlayer 12 and the compensation layer 21.

Of course, other modifications to the structure of this embodiment are possible in terms of additional seed layers and the like.

A coercivity Hc of the magnetic recording medium has a functional relationship with the magnetic anisotropy constant Ku, the magnetization Ms, a magnetic switching volume V, and a switching time $t^*$. As described by M. P. Sharrock, "Time Dependence of Switching Fields in Magnetic Recording Media", J. Appl. Phys., 76(10), p.6413, 1999, the coercivity Hc at a particular temperature T can be described by the following formula (1), where $t^*$ denotes the switching time, V denotes the switching volume, Hk denotes an anisotropy energy (=2 Ku/Ms), and k denotes the Boltzman constant.

$$Hc = xHk[1 - \{(kT/KuV)\ln(At^*)\}^n] \quad (1)$$

For a magnetic recording medium having the axis of easy magnetization randomly distributed in the film plane, x=0.5 and n=2/3 describe the above relationship effectively by the formula (1). The parameters such as the magnetic anisotropy constant Ku and the magnetization Ms change with the temperature T, thereby leading to a change in the coercivity Hc.

Figure 5:
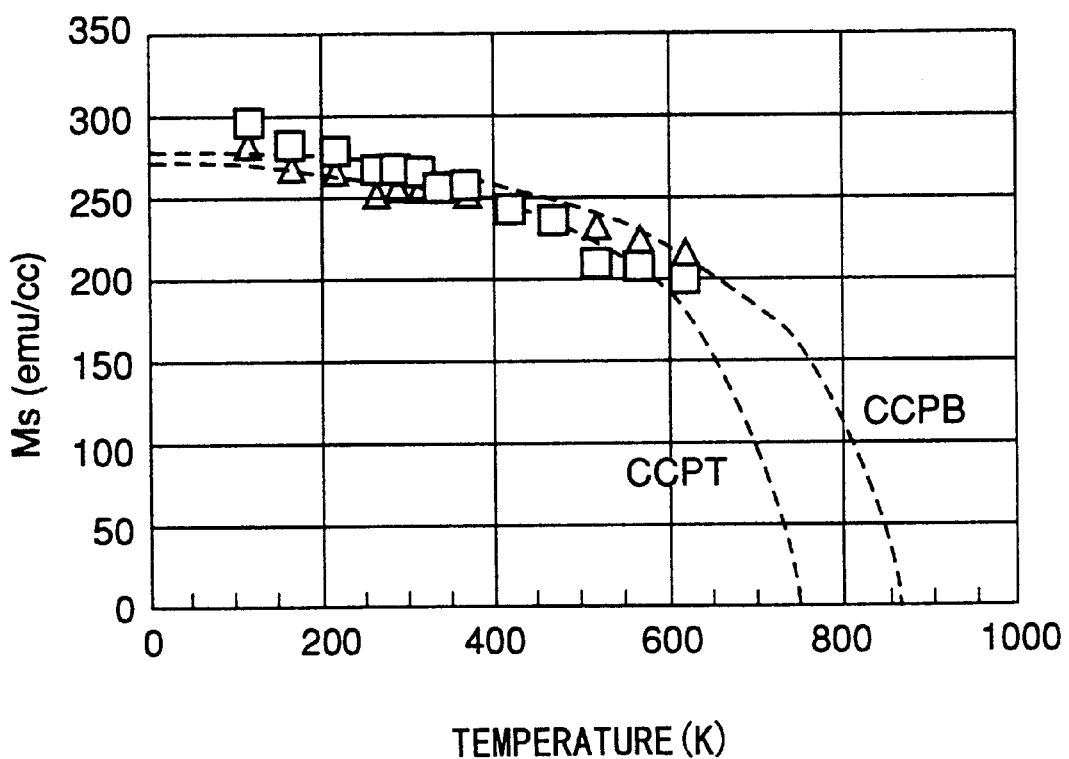
FIG. 5 is a diagram showing a change in magnetization with respect to temperature.
Figure 21:
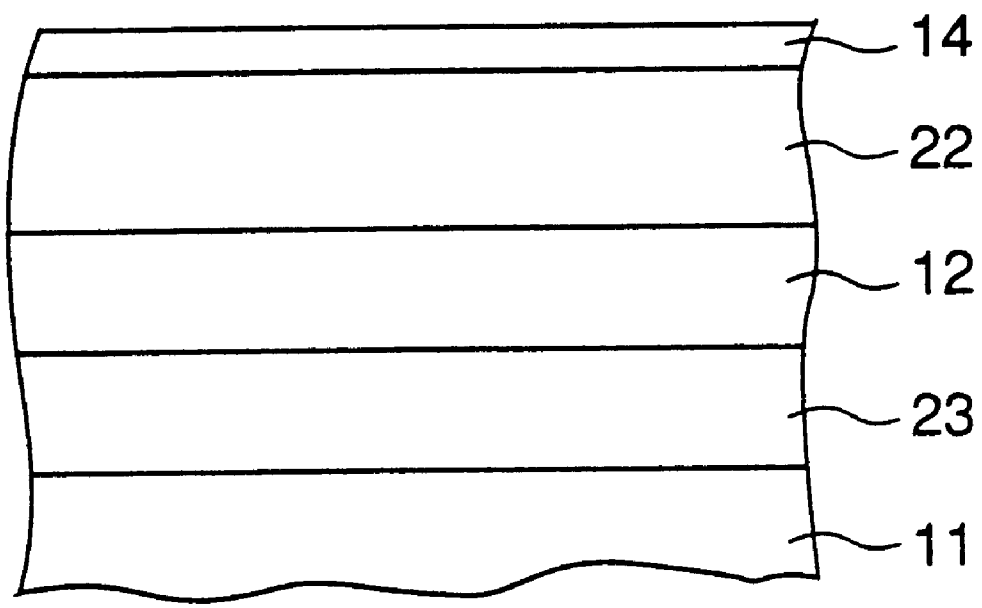
FIG. 21 is a cross sectional view showing an important part of a magnetic recording medium for explaining changes shown in FIGS. 5 and 7.

FIG. 5 is a diagram showing a change in the magnetization Ms with respect to the temperature T in this embodiment for two different compositions. In FIG. 5, CCPT indicates the change for a case where the overlayer 14, the recording layer 22, the underlayer 12, a precoated layer 23 and the substrate 11 of a magnetic recording medium having the structure shown in FIG. 21 are made up of C/CoCrPtTa/CrMo/NiAl/glass, and CCPB indicates the change for a case where the overlayer 14, the recording layer 22, the underlayer 12, the precoated layer 23 and the substrate 11 of the magnetic recording medium having the structure shown in FIG. 21 are made up of C/CoCrPtB/CrMo/NiAl/glass. In FIG. 5, the ordinate indicates the magnetization Ms in emu/cc, and the abscissa indicates the temperature T in K.

The magnetization decrease with temperature for a ferromagnetic material can be represented by a functional relation called a Brillioun function, as described by B. D. Cullity, "Introduction to Magnetic Materials", p.121, Addison-Wesley, 1972. The decrease of the magnetization Ms with the temperature T as described by the Brillioun function is indicated by dotted lines in FIG. 5.

As may be seen from FIG. 5, the magnetization Ms shows a sharp decrease in a temperature range near to the Curie temperature of the magnetic layer 13. However, in such a temperature range, the magnetic anisotropy constant Ku of the magnetic recording medium is very small, as may be seen from FIG. 6.

Figure 6:
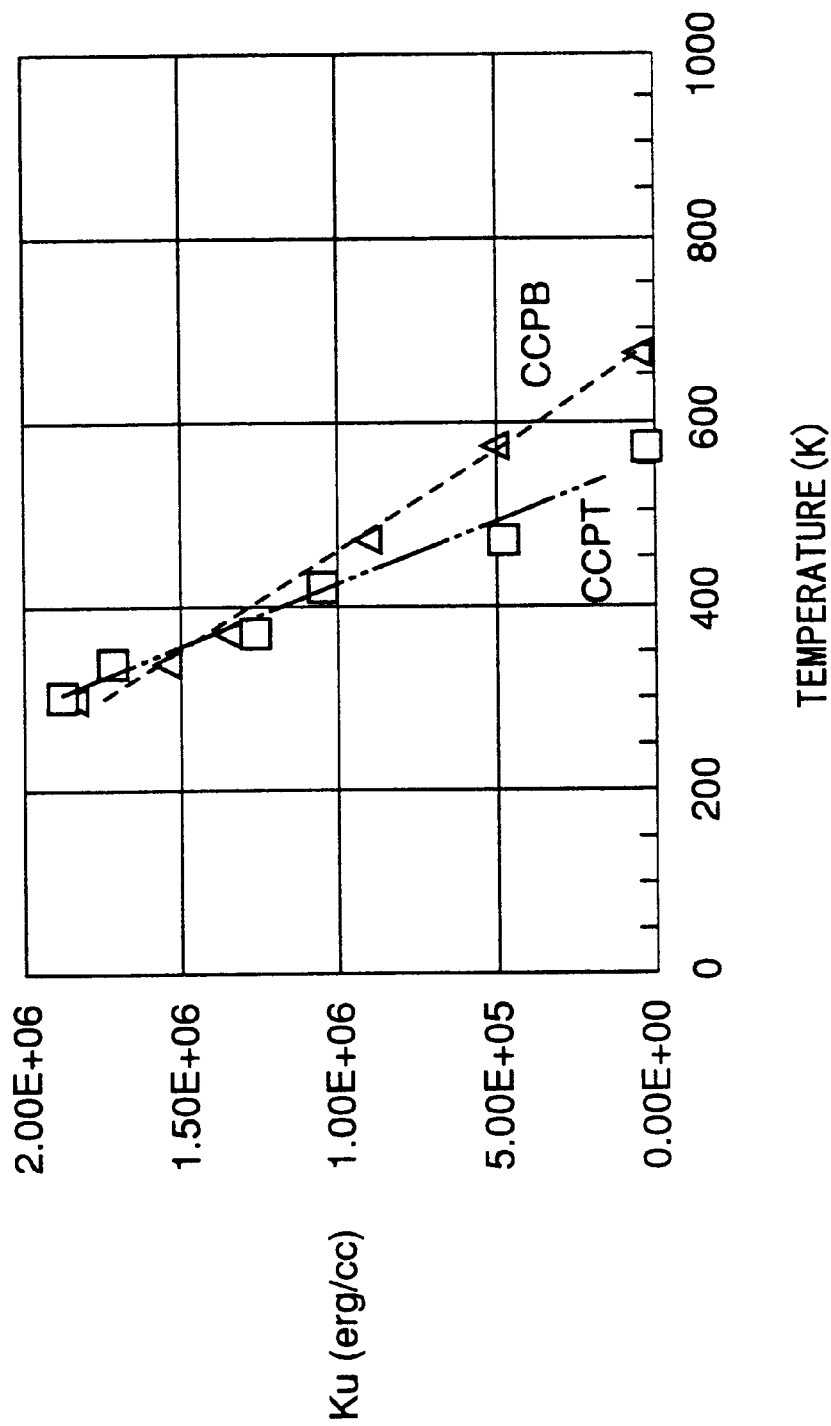
FIG. 6 is a diagram showing a change in magnetic anisotropy constant with respect to temperature.

FIG. 6 is a diagram showing a change in the magnetic anisotropy constant Ku with respect to the temperature T in this embodiment for two different compositions. In FIG. 6, the same designations are used as in FIG. 5. In order to obtain a high magnetic anisotropy constant Ku, the composition of the magnetic recording medium is selected so that the Curie temperature Tc of the magnetic layer 13 has a Curie temperature Tc which is higher than the room temperature. In FIGS. 5 and 6, the decrease of the magnetization Ms in the temperature range of 0 to 100° C. is approximately 3 to 4%, while the decrease of the magnetic anisotropy constant Ku is approximately 25%.

Figure 7:
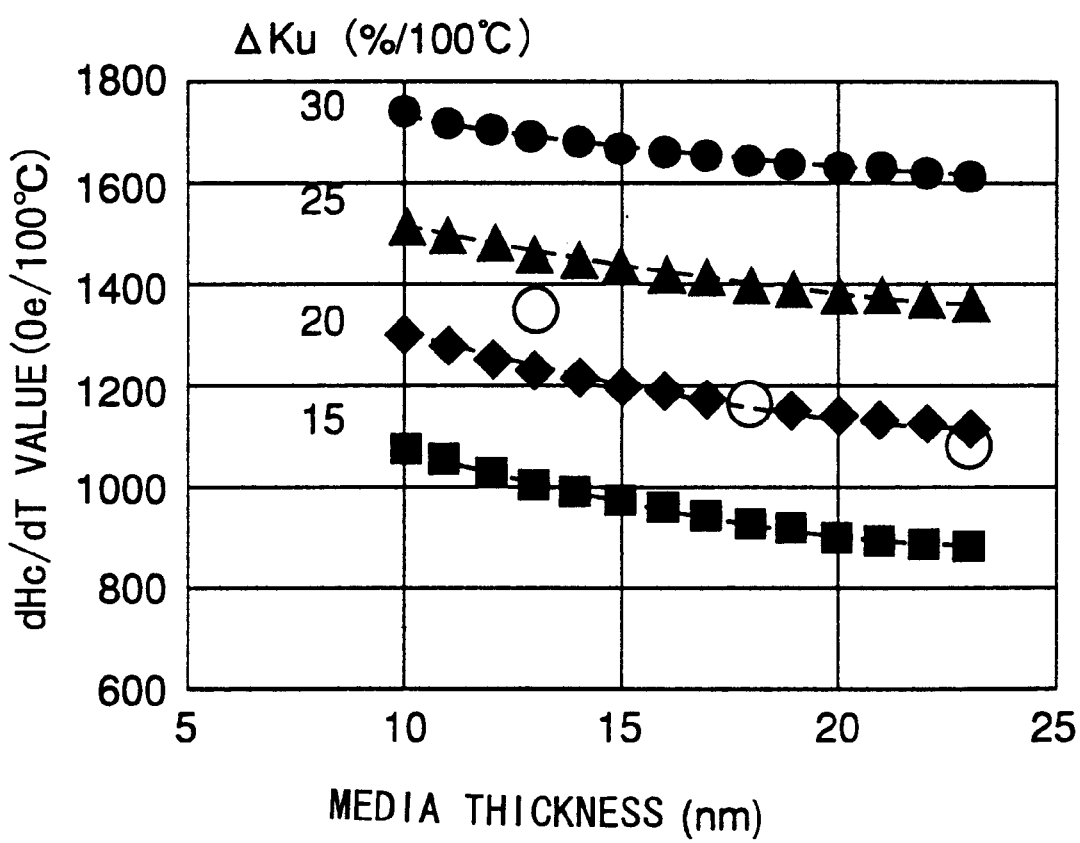
FIG. 7 is a diagram showing a change in dHc/dT value with respect to media thickness using ΔKu as the parameter.

FIG. 7 is a diagram showing a change in dHc/dT value with respect to media thickness using $\Delta Ku$ as the parameter, for this embodiment.

Generally, the temperature coefficient of the coercivity Hc in most cases is defined as a change in the coercivity Hc per 1° C. But for the sake of convenience, the dHc/dT value used in this embodiment indicates the change of the coercivity Hc per 100° C. (Oe/100° C.).

In FIG. 7, the ordinate indicates the dHc/dT value in Oe/100° C., and the abscissa indicates the media thickness in nm. The dHc/dT value indicates a temperature coefficient of the coercivity for a case where the overlayer 14, the recording layer 22, the underlayer 12, the precoated layer 23 and the substrate 11 of the magnetic recording medium having the structure shown in FIG. 21 are made up of C/CoCrPtB/CrMo/NiAl/glass, which is computed using the formula (1) described above. For this computation, the parameters Hk and KuV/kT at the room temperature were estimated by fitting the coercivity Hc to the switching time t* as discussed by M. P. Sharrock, "Time Dependence of Switching Fields in Magnetic Recording Media", J. Appl. Phys., 76(10), p.6413, 1999. A decrease in the magnetization Ms of 4% was assumed between the temperatures of 0 and 100° C. The calculated values of the dHc/dT value in this case for different media thicknesses corresponding to the decrease in the magnetic anisotropy constant Ku, that is, ΔKu, of 15 to 30%/100° C. (15, 20, 25, 30%/100° C.), is shown along with experimental results which are indicated by white circular marks "○" in FIG. 7. ΔKu may be changed by changing the materials and/or composition ratios of each of the layers forming the magnetic recording medium.

A good correlation between the experimental values and those estimated by the formula (1) is seen for ΔKu of 20 to 25% which are near to the value estimated by the measurement of the magnetic anisotropy constant Ku in FIG. 6. This correlation indicates that the dHc/dT value can be estimated using the formula (1) to a fair degree of accuracy, and is used for estimating the advantageous features of this embodiment.

Figure 8:
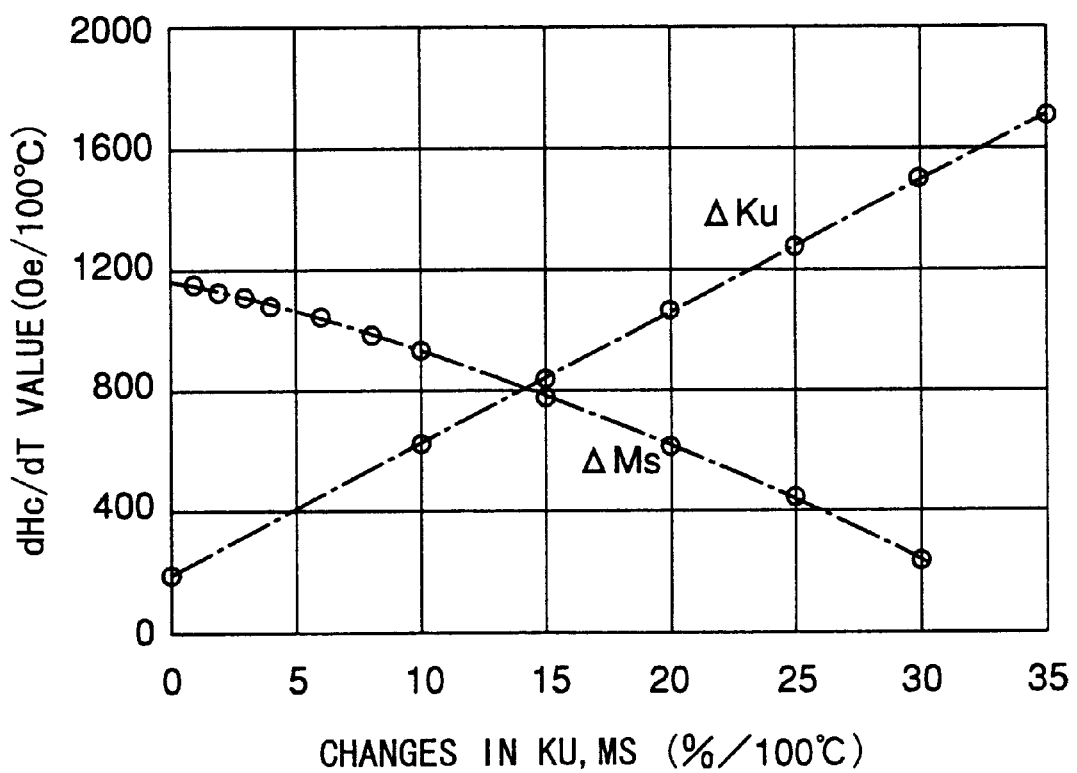
FIG. 8 is a diagram showing a change in dHc/dT value with respect to magnetic anisotropy constant and magnetization.

FIG. 8 is a diagram showing a change in dHc/dT value with respect to the magnetic anisotropy constant Ku and the magnetization Ms which are estimated using the formula (1). In FIG. 8, the ordinate indicates the dHc/dT value in Oe/100° C., and the abscissa indicates ΔKu and ΔMs which respectively are the % change in the magnetic anisotropy constant Ku and the % change in the magnetization Ms.

When ΔKu changes from 0 to 20%, the dHc/dT value increases from 170 to 1070 Oe/100° C., as may be seen from FIG. 8. The higher value of the dHc/dT value can be reverted back to the lower value only by a decrease in the magnetization Ms by 30%. In other words, the following relationships stand. First, the dHc/dT value increases with a decrease in the magnetic anisotropy value Ku. Second, the dHc/dT value increases with a decrease in the magnetic grain volume in terms of the media thickness or the grain size. Third, such increases in the dHc/dT value can be compensated by a decrease in the magnetization Ms. However, in the conventional magnetic recording medium having the magnetic layer with a single-layer structure as shown in FIG. 1, for example, such compensation cannot be realized since the magnetization Ms only decreases by approximately 3 to 4% at the room temperature.

Figure 9:
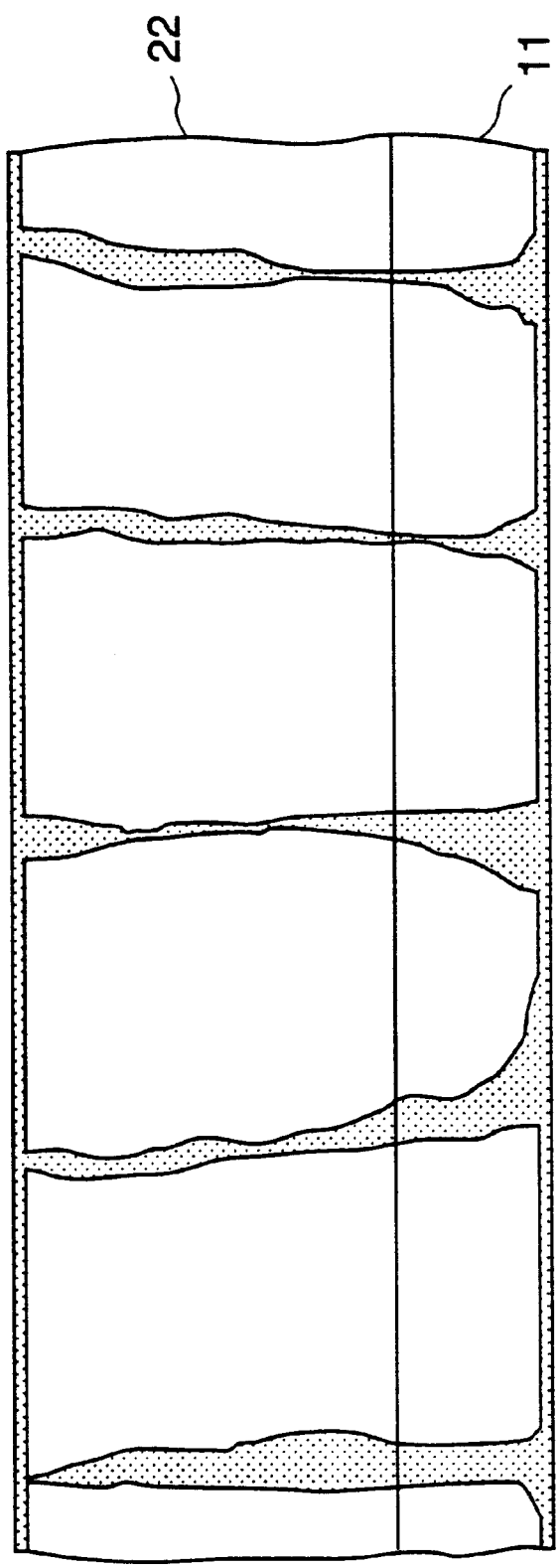
FIG. 9 is a cross sectional view showing the grain structure of a compensation layer and a recording layer.

FIG. 9 is a cross sectional view showing the grain structure of the compensation layer 21 and the recording layer 22 of this embodiment. The grains of the recording layer 22 grow epitaxially on the grains of the compensation layer 21, and the compensation layer 21 and the recording layer 22 have the same grain structure in terms of the grain diameters. Such a grain growth is a common phenomenon in longitudinal magnetic recording media for high-density recording, wherein the magnetic grains of the magnetic layer grow epitaxially on the grains of the underlayer. By the epitaxial growth of the grains, the grains of the compensation layer 21 and the grains of the recording layer 22 become magnetically exchange-coupled.

Figure 10A:
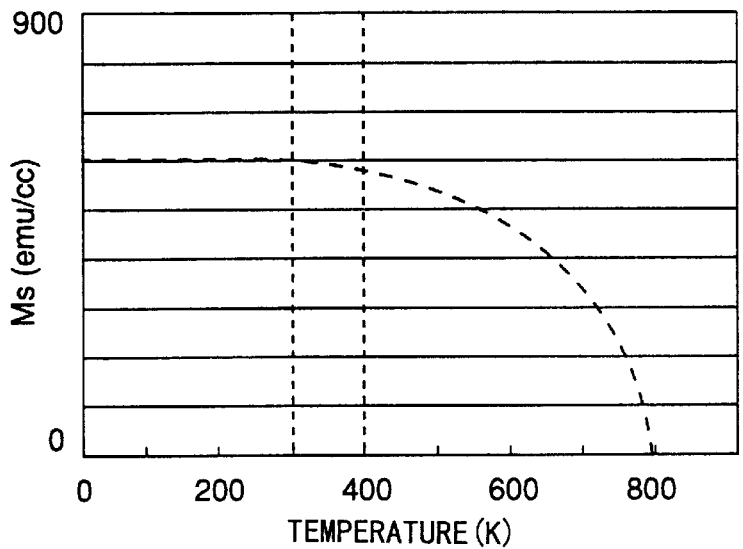
FIGS. 10A and 10B are diagrams for comparing changes in magnetizations with respect to temperatures for a conventional magnetic recording medium and the first embodiment of the magnetic recording medium.
Figure 10B:
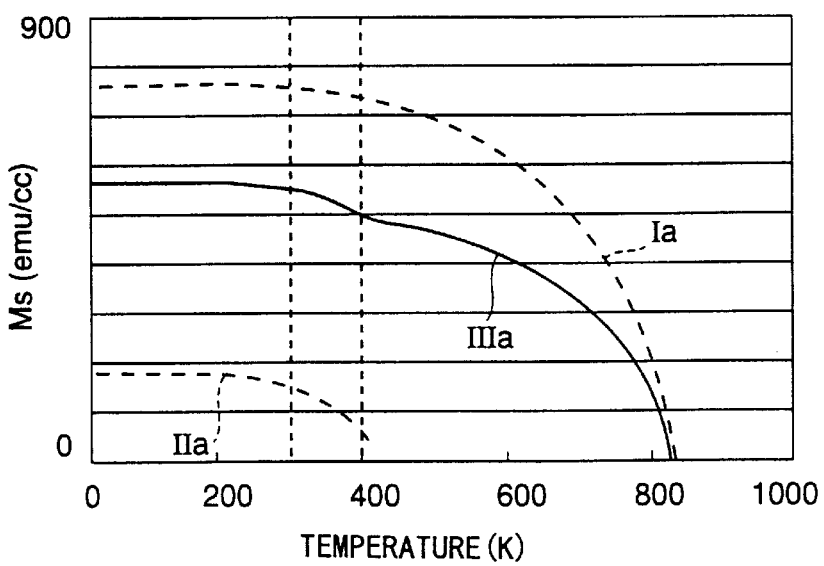

FIGS. 10A and 10B are diagrams for comparing changes in the magnetizations Ms with respect to the temperatures for a conventional magnetic recording medium and the first embodiment of the magnetic recording medium. In addition, FIGS. 11A and 11B are diagrams for comparing changes in the magnetic anisotropy constants Ku with respect to the temperatures for the conventional magnetic recording medium and the first embodiment of the magnetic recording medium.

Figure 1:
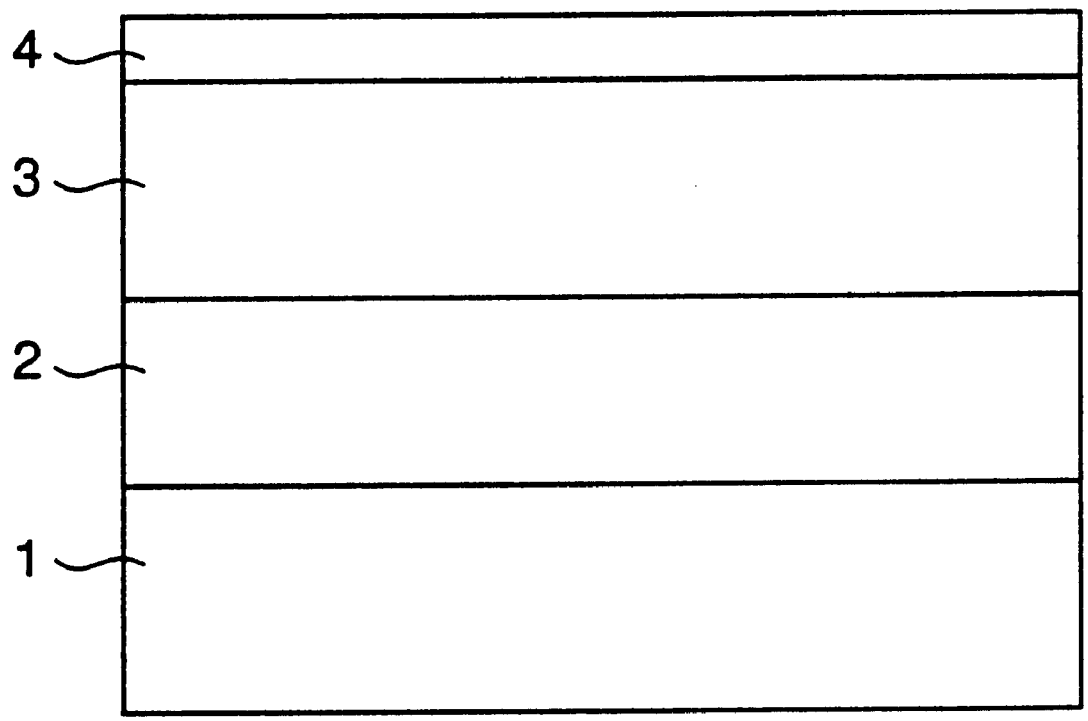
FIG. 1 is a cross sectional view showing an important part of a typical longitudinal magnetic recording medium.
Figure 2:
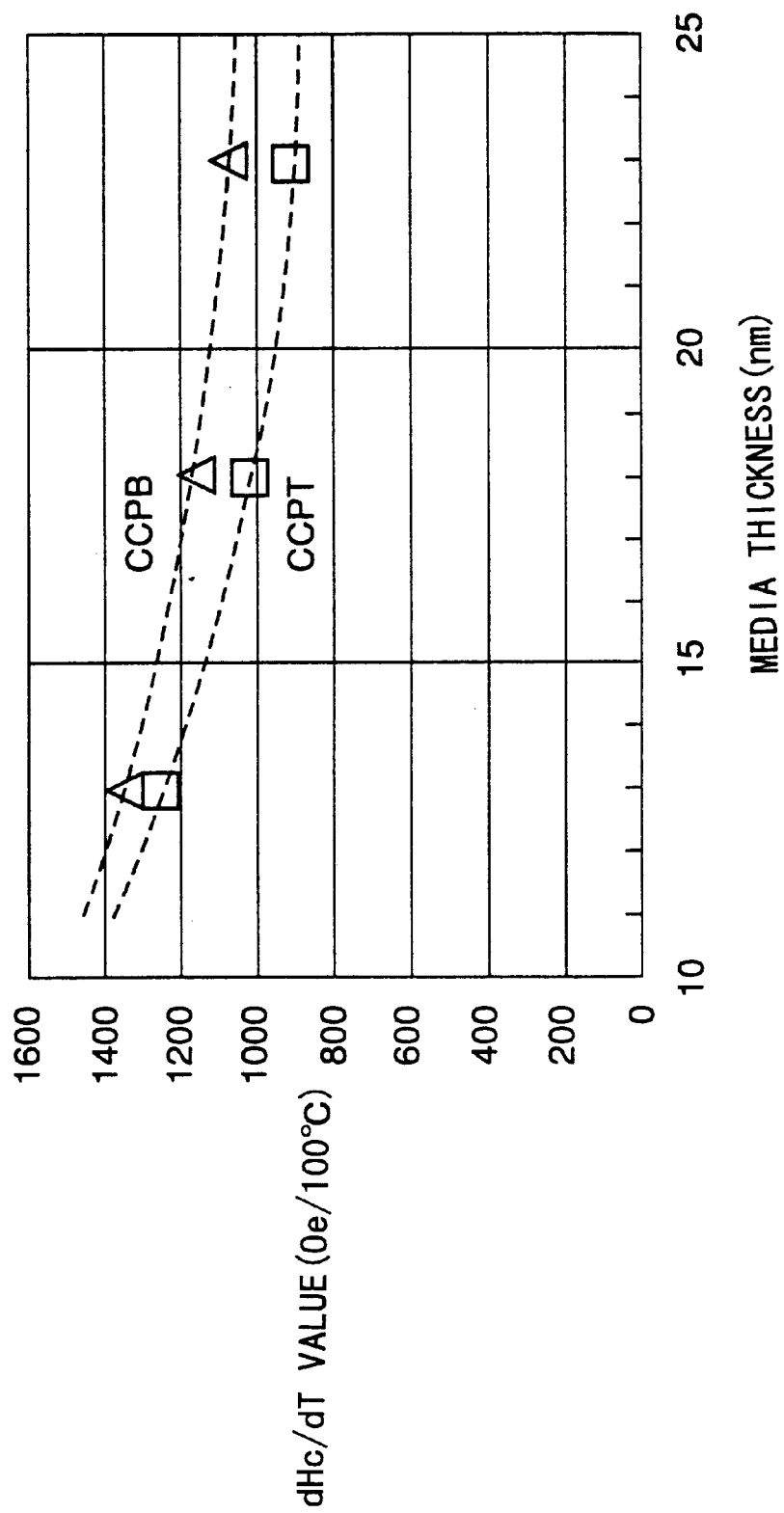
FIG. 2 is a diagram showing the coercivity of the magnetic recording medium over the operating temperature range with respect to the media thickness.
Figure 3:
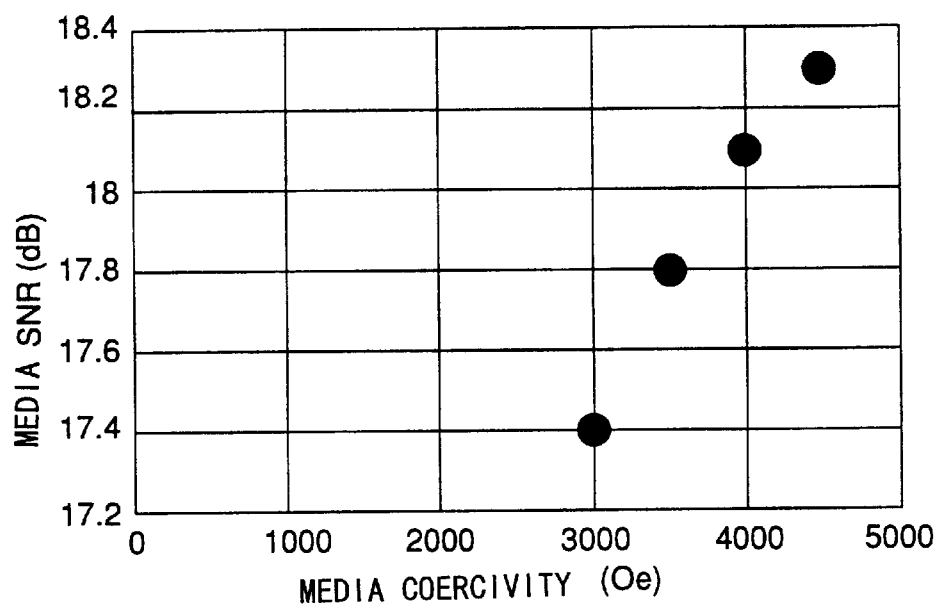
FIG. 3 is a diagram showing a trend in decreasing media SNR with decreasing coercivity.
Figure 11A:
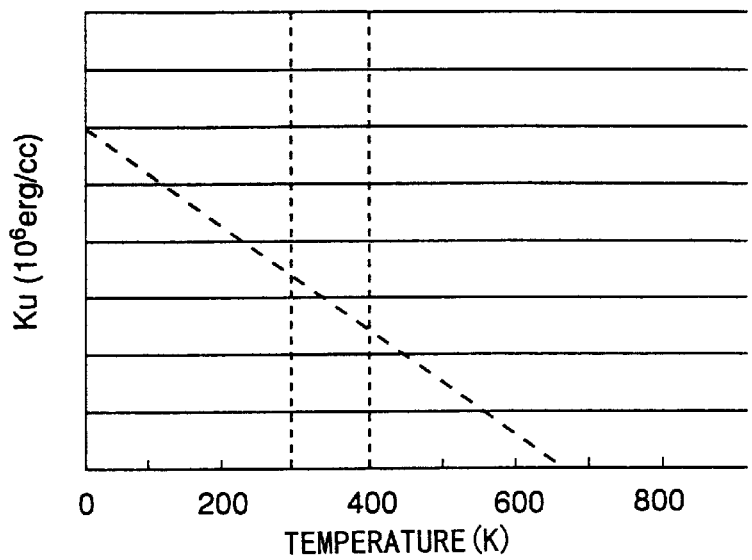
FIGS. 11A and 11B are diagrams for comparing changes in magnetic anisotropy constants with respect to temperatures for the conventional magnetic recording medium and the first embodiment of the magnetic recording medium.

FIG. 10A and FIG. 11A respectively show the changes in the magnetization Ms and the magnetic anisotropy constant Ku with respect to the temperature for the conventional magnetic recording medium shown in FIG. 1 having the magnetic layer 3 with a single-layer structure and a film thickness of 18 nm. In addition, specific values at the temperatures of 300 K and 400 K are shown in FIG. 12.

Figure 11B:
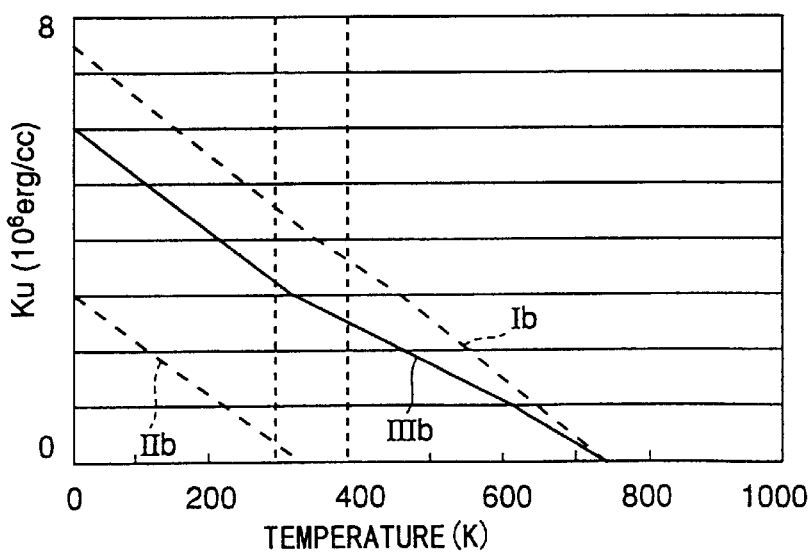

On the other hand, FIG. 10B and FIG. 11B respectively show the changes in the magnetization Ms and the magnetic anisotropy constant Ku with respect to the temperature for the first embodiment of the magnetic recording medium shown in FIG. 4 having the magnetic layer 13 which is made up of the compensation layer 21 having a film thickness of 6 nm and the recording layer 22 having a film thickness of 12 nm. In FIG. 10B, curves Ia, IIa and IIIa respectively show the maginetization Ms of the recording layer 22, the magnetization Ms of the compensation layer 21, and the magnetization Ms of the magnetic layer 13 as a whole. Similarly, in FIG. 11B, curves Ib, IIb and IIIb respectively show the magnetic anisotropy constant Ku of the recording layer 22, the magnetic anisotropy constant Ku of the compensation layer 21, and the magnetic anisotropy constant Ku of the magnetic layer 13 as a whole. Further, specific values at the temperatures of 300 K and 400 K are shown in FIG. 13.

Figure 12:
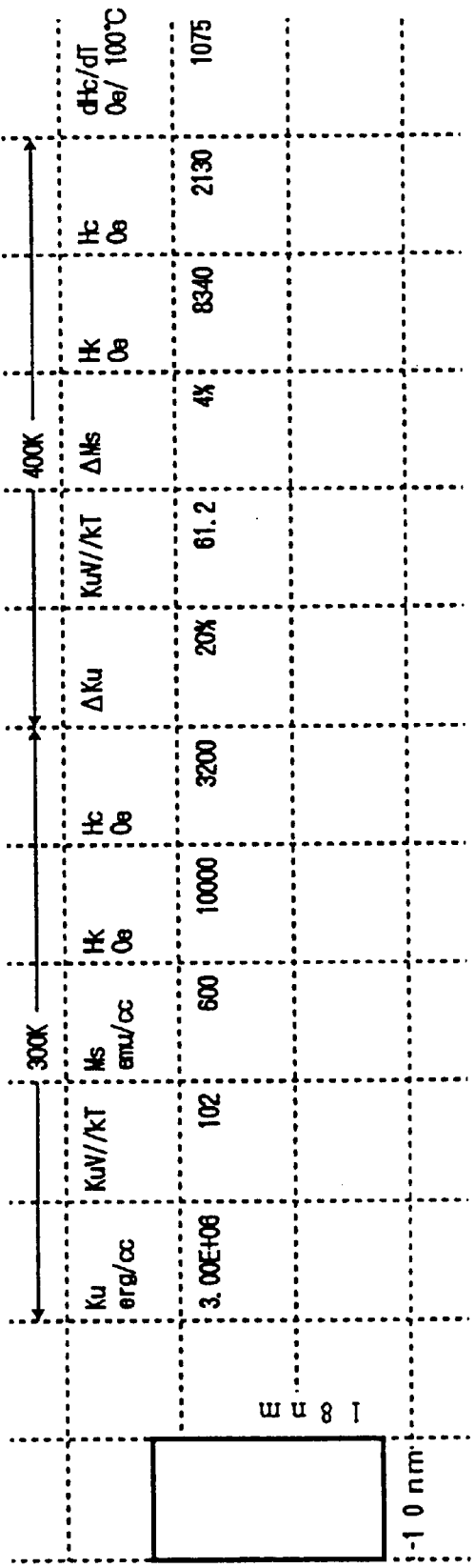
FIG. 12 is a diagram showing specific values for the conventional magnetic recording medium at the temperatures of 300 K and 400 K.
Figure 13:
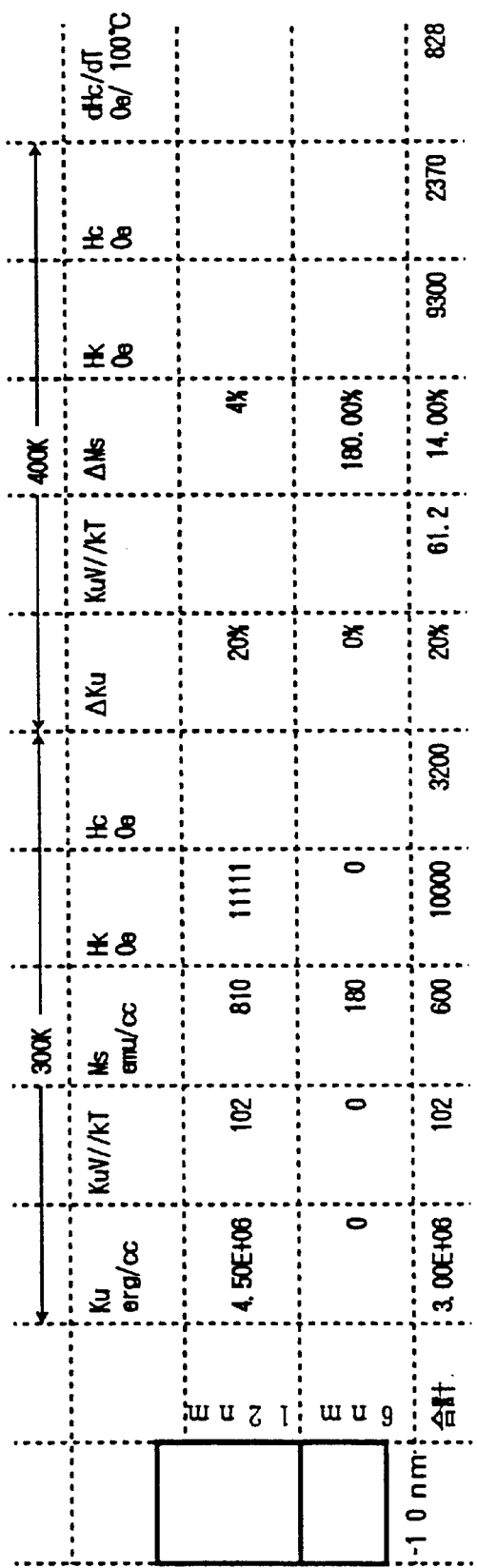
FIG. 13 is a diagram showing specific values for the first embodiment of the magnetic recording medium at the temperatures of 300 K and 400 K.

It may be seen from a comparison of FIGS. 13 and 12 that the dHc/dT value of this embodiment can be improved, that is, reduced, as compared to the conventional magnetic recording medium. Of course, different combinations of the film thickness and the magnetic parameters are possible.

When the temperature increases from 5° C. to 65° C., the change in the magnetic anisotropy constant Ku of this embodiment is determined by the change in the magnetic anisotropy constant Ku of the recording layer 22, due to the negligibly small magnetic anisotropy constant Ku of the compensation layer 21 over the whole temperature range. However, due to a sharp decrease in the magnetization Ms of the compensation layer 21, the total magnetization Ms of the magnetic layer 13 as a whole shows a sharp drop as may be seen from the curve IIIa in FIG. 10B.

Accordingly, it is possible to engineer a sharp decrease in the total magnetization Ms of the magnetic layer 13 as a whole while retaining the same drop in the magnetic anisotropy constant Ku as the recording layer 22. In the case shown in FIGS. 10B and 11B, for a decrease of 14% in the total magnetization Ms of the magnetic layer 13 as a whole, the dHc/dT value falls from 1080 Oe/100° C. for the conventional magnetic recording medium to 830 Oe/100° C. for this first embodiment of the magnetic recording medium, based on estimations using the formula (1). In other words, the total magnetization Ms of the magnetic layer 13 as a whole can be made to decrease by approximately 10 to 25% over the temperature range of 0 to 100° C.

Figure 14:
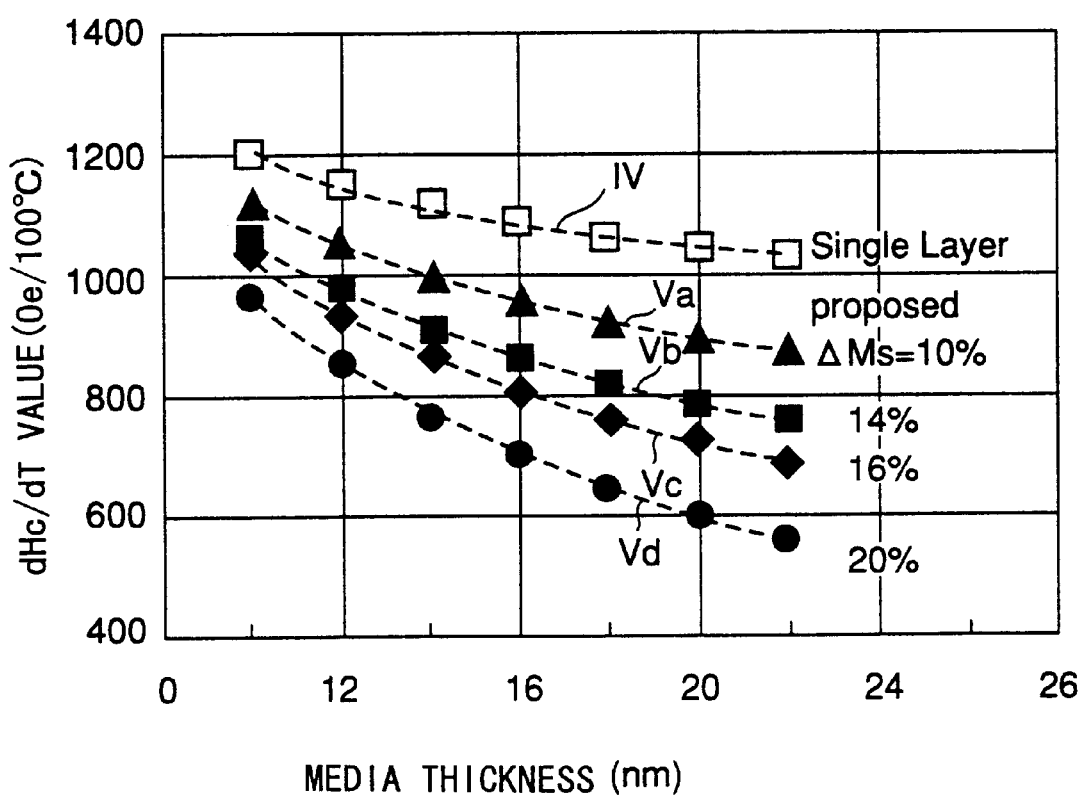
FIG. 14 is a diagram showing a dHc/dT value with respect to media thickness for the first embodiment of the magnetic recording medium.

FIG. 14 is a diagram: showing the dHc/dT value with respect to the media thickness for this embodiment of the magnetic recording medium. For comparison purposes, FIG. 14 also shows the dHc/dT value with respect to the media thickness for the conventional magnetic recording medium shown in FIG. 1. In FIG. 14, a curve IV shows the dHc/dT value for the conventional magnetic recording medium, while curves Va, Vb, Vc and Vd respectively show the dHc/dT values for this first embodiment of the magnetic recording medium with estimated changes ΔMs in the magnetization Ms of 10%, 14%, 16% and 20%. ΔMs can be changed by changing the materials and/or composition ratios of each of the layers forming the magnetic recording medium.

A larger improvement of the dHc/dT value over that of the conventional magnetic recording medium can be expected for a larger drop in the magnetization Ms by choosing suitable layer structure and properties of this embodiment of the magnetic recording medium. A large drop in the magnetization Ms at 65° C. may lead to a decrease in an output signal of a read head. However, such a signal decrease would not be a severe problem due to the high sensitivity of spin valve heads. In other words, the media noise of this embodiment of the magnetic recording medium at 65° C. will be small compared to the media noise of the conventional magnetic recording medium due to the comparatively higher coercivity Hc of this embodiment of the magnetic recording medium.

Therefore, compared to the conventional magnetic recording medium which has the magnetic layer with the single-layer structure and no compensation layer, the change in the coercivity Hc of this embodiment over a temperature range of 0 to 100° C. is 100 to 500 Oe smaller.

Figure 15:
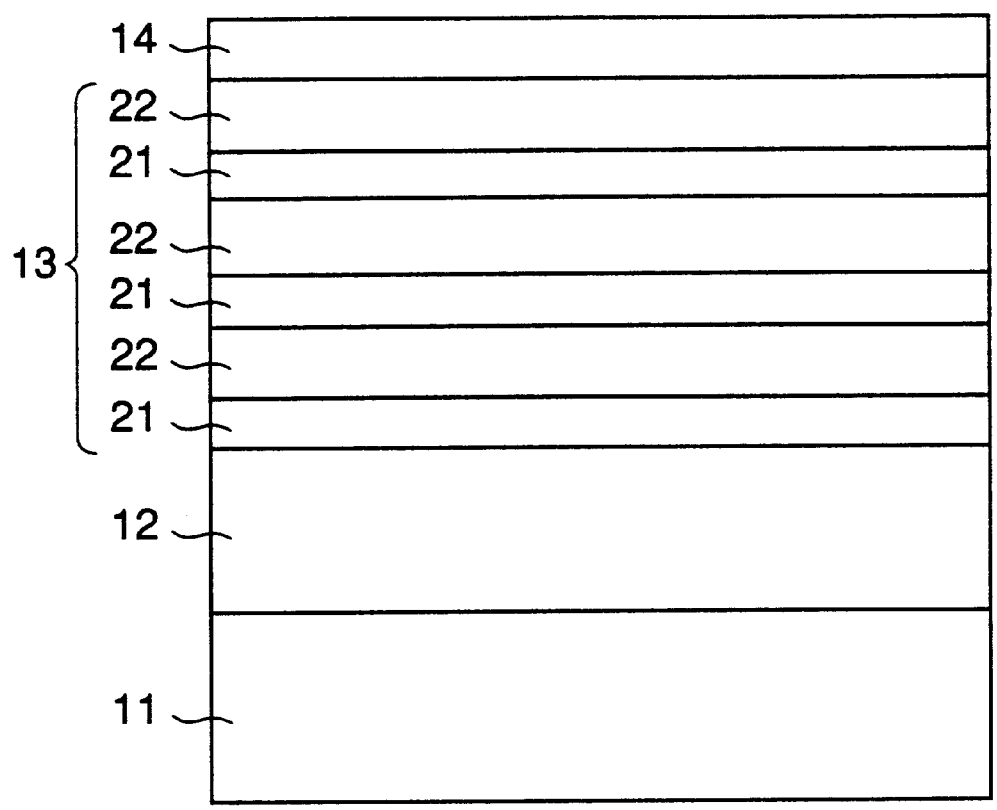
FIG. 15 is a cross sectional view showing an important part of a second embodiment of the magnetic recording medium according to the present invention.

FIG. 15 is a cross sectional view showing an important part of a second embodiment of the magnetic recording medium according to the present invention. In FIG. 15, those parts which are the same as those corresponding parts in FIG. 4 are designated by the same reference numerals, and a description thereof will be omitted.

In this second embodiment, the magnetic layer 13 has a multi-layer structure made up of three pairs of the compensation layer 21 and recording layer 22 which are successively stacked on the underlayer 12. According to this embodiment, it is also possible to improve the dHc/dT value similarly to the first embodiment.

Figure 16:
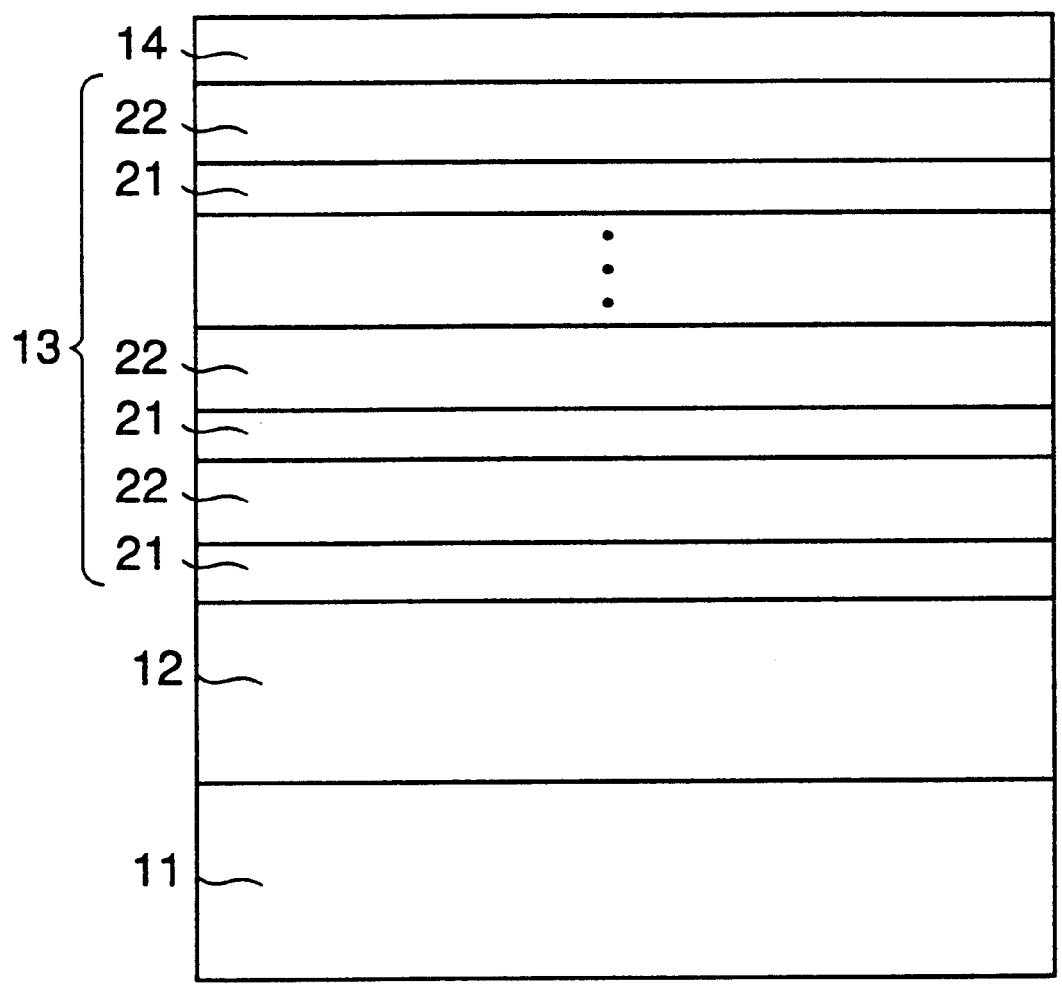
FIG. 16 is a cross sectional view showing an important part of a third embodiment of the magnetic recording medium according to the present invention.

FIG. 16 is a cross sectional view showing an important part of a third embodiment of the magnetic recording medium according to the present invention. In FIG. 16, those parts which are the same as those corresponding parts in FIG. 4 are designated by the same reference numerals, and a description thereof will be omitted.

In this third embodiment, the magnetic layer 13 has a multi-layer structure made up of n pairs of the compensation layer 21 and recording layer 22 which are successively stacked on the underlayer 12, where n is an arbitrary integer. According to this embodiment, it is also possible to improve the dHc/dT value similarly to the first embodiment.

Figure 17:
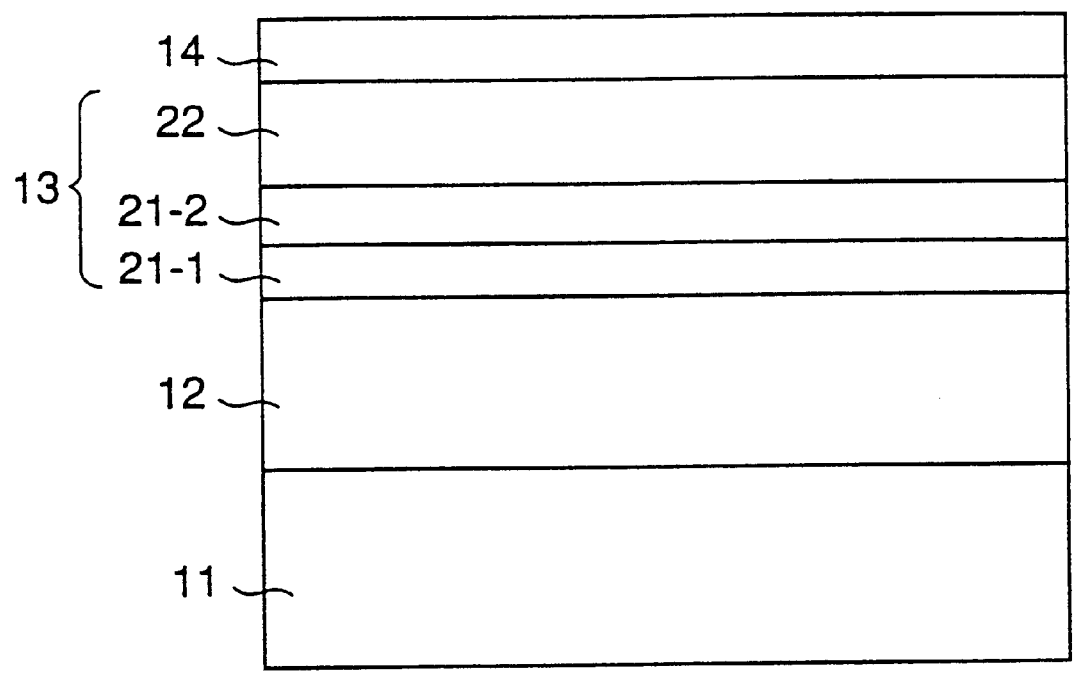
FIG. 17 is a cross sectional view showing an important part of a fourth embodiment of the magnetic recording medium according to the present invention.

FIG. 17 is a cross sectional view showing an important part of a fourth embodiment of the magnetic recording medium according to the present invention. In FIG. 17, those parts which are the same as those corresponding parts in FIG. 4 are designated by the same reference numerals, and a description thereof will be omitted.

In this fourth embodiment, the magnetic layer 13 has a tri-layer structure made up of two compensation layers 21-1 and 21-2 and the recording layer 22 which are successively stacked on the underlayer 12. The compensation layer 21-1 is provided on the underlayer 12, the compensation layer 21-2 is provided on the compensation layer 21-1, and the recording layer 22 is provided on the compensation layer 21-2. For example, the Curie temperature Tc of the compensation layer 21-1 is 0 to 50° C., and the compensation layer 21-1 is made of a Co-based alloy having a thickness of 1 to 5 nm. In addition, the Curie temperature Tc of the compensation layer 21-2 is 30 to 150° C., and the compensation layer 21-2 is made of a Co-based alloy having a thickness of 3 to 15 nm. Furthermore, the Curie temperature Tc of the recording layer 22 is 250 to 800° C., and the recording layer 22 is made of a Co-based alloy having a thickness of 10 to 30 nm. The compensation layers 21-1 and 21-2 and the recording layer 22 have the same grain structure in terms of the grain diameters.

Compared to the conventional magnetic recording medium which has the magnetic layer with the single-layer structure and no compensation layer, the change in the coercivity Hc of this embodiment over a temperature range of 0 to 100° C. is 100 to 500 Oe smaller.

According to this embodiment, it is also possible to improve the dHc/dT value similarly to the first embodiment. Moreover, the provision of the second compensation layer further helps in obtaining a drop in the magnetization Ms of the magnetic layer 13 as a whole in two stages, thereby making it possible to obtain a lower temperature coefficient of coercivity.

Figure 18:
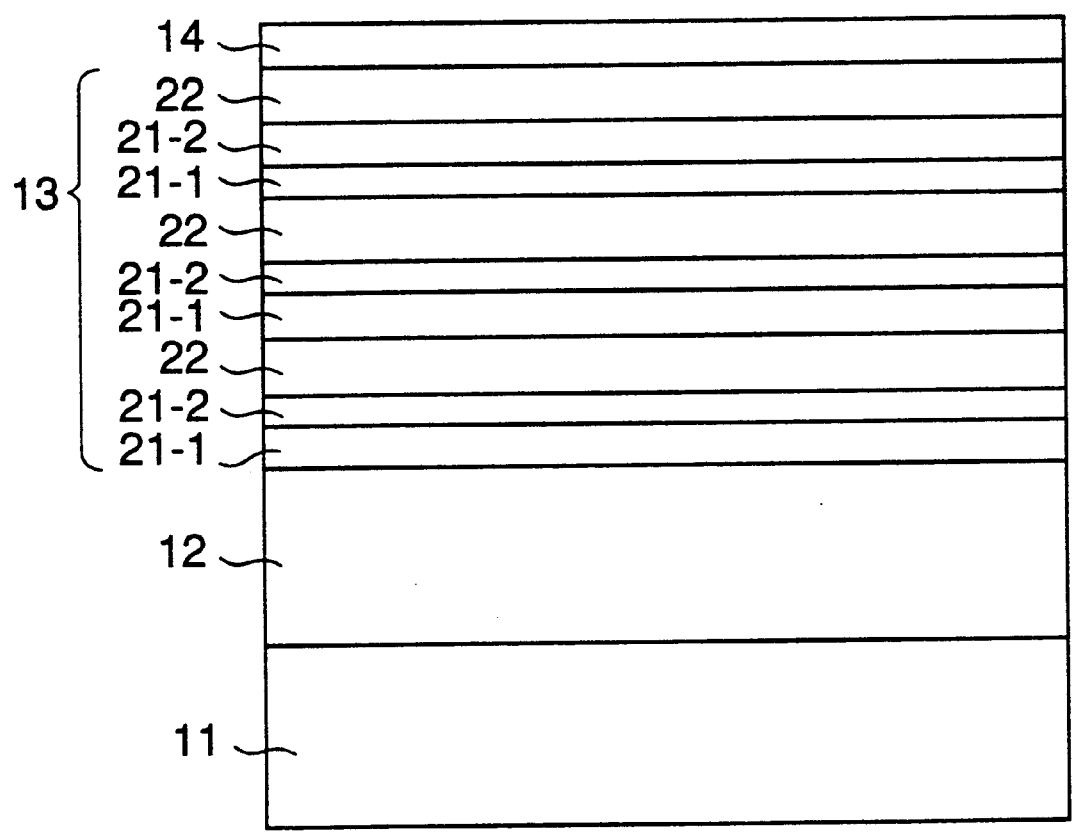
FIG. 18 is a cross sectional view showing an important part of a fifth embodiment of the magnetic recording medium according to the present invention.

FIG. 18 is a cross sectional view showing an important part of a fifth embodiment of the magnetic recording medium according to the present invention. In FIG. 18, those parts which are the same as those corresponding parts in FIG. 17 are designated by the same reference numerals, and a description thereof will be omitted.

In this embodiment, three tri-layer structures shown in FIG. 17 are successively provided on the underlayer 12, as shown in FIG. 18. Of course, n such tri-layer structure may be provided, where n is an arbitrary integer. According to this embodiment, it is also possible to improve the dHc/dT value similarly to the fourth embodiment.

Of course, the modifications of the first embodiment described above may be similarly applied to the second through fifth embodiments, so as to provide additional intermediate and/or seed layers.

The purposes and effects of the bi-layer, tri-layer and multi-layer structures forming the magnetic layer in the present invention are completely different from those of the conventional magnetic recording media employing a bi-layer or multi-layer structure.

For example, a U.S. Pat. No. 5,922,442 to Lal et al. proposes an interlayer between an under layer and a recording layer, where the interlayer is made of a CoCr alloy having a thickness of 1 to 6 nm and a saturation magnetization of 10 to 50 emu/cm$^3$. However, the purpose of such an interlayer is to perform lattice matching with a magnetic layer, to thereby enhance the magnetic properties, particularly coercivity.

In addition, Ohkijima et al., "Effect of CoCr Interlayer on Longitudinal Recording", I.E.E.E. Trans. Magn., Vol. 33, p. 2944, 1997 discusses the improvement of crystallographic properties. U.S. Pat. No. 5,820,963 to Lu et al. proposes similar improvements in the crystal structure using a non-ferromagnetic intermediate layer.

However, the proposals of Lal et al., Ohkijima et al. and Lu et al. do not discuss or suggest means of improving the temperature coefficient of the coercivity as in the case of the present invention.

Figure 19:
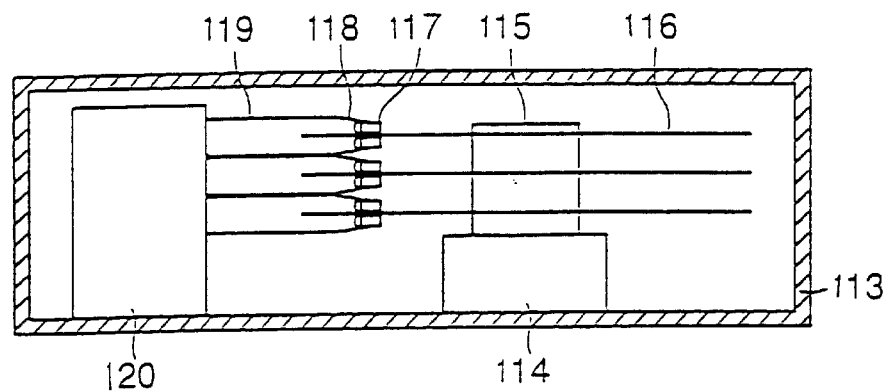
FIG. 19 is a cross sectional view showing an important part of an embodiment of a magnetic storage apparatus according to the present invention.

Next, a description will be given of an embodiment of a magnetic storage apparatus according to the present invention, by referring to FIGS. 19 and 20. FIG. 19 is a cross sectional view showing an important part of this embodiment of the magnetic storage apparatus, and FIG. 20 is a plan view showing the important part of this embodiment of the magnetic storage apparatus.

Figure 20:
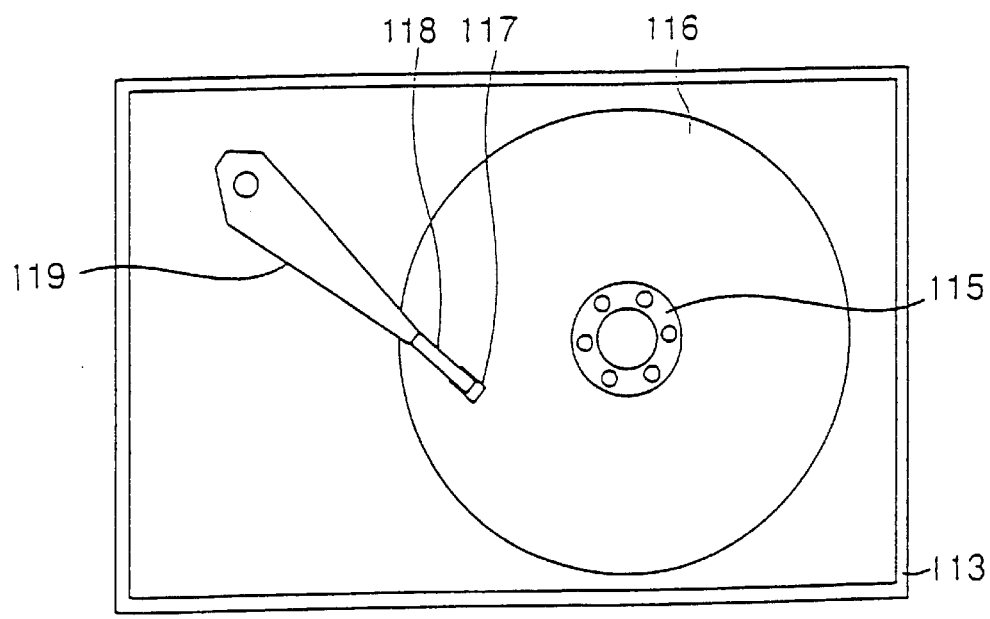
FIG. 20 is a plan view showing the important part of the embodiment of the magnetic storage apparatus.

As shown in FIGS. 19 and 20, the magnetic storage apparatus generally includes a housing 113. A motor 114, a hub 115, a plurality of magnetic recording media 116, a plurality of recording and reproducing (read and write) heads 117, a plurality of suspensions 118, a plurality of arms 119, and an actuator unit 120 are provided within the housing 113. The magnetic recording media 116 are mounted on the hub 115 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording media 116. Each magnetic recording medium 116 has the structure of any of the first through fifth embodiments of the magnetic recording medium described above in conjunction with FIGS. 4 through 18. Of course, the number of magnetic recording media 116 is not limited to three, and only one, two or four or more magnetic recording media 116 may be provided.

The basic construction of the magnetic storage apparatus is not limited to that shown in FIGS. 19 and 20. In addition, the magnetic recording medium used in the present invention is not limited to a magnetic disk.

Further, the present invention is not limited to these embodiments, but various variations and modifications may be made without departing from the scope of the present invention.

What is claimed is:

1. A magnetic recording medium comprising:
   a non-magnetic underlayer; and
   a magnetic layer including a compensation layer provided on said non-magnetic underlayer, and a recording layer provided on said compensation layer,
   said compensation layer having a thickness of 3 to 15 nm, and being made of Co or a Co alloy with a Curie temperature of approximately 30 to 150° C.,
   said recording layer having a thickness of 10 to 30 nm, and being made of a Co alloy with a Curie temperature of approximately 250 to 800° C.

2. The magnetic recording medium as claimed in claim 1, wherein said compensation layer is made of a material selected from a group consisting of CoCr, CoCrTa, CoCrPt, CoCrW, CoCrB, CoCrPtTa, CoCrPtB, CoCrPtW, CoCrPtTaB and CoCrPtTaNb which include 60 to 80 atomic percent of Co and 20 to 40 atomic percent of Cr or other elements.

3. The magnetic recording medium as claimed in claim 1, wherein said recording layer is made of a material selected from a group consisting of CoCr, CoCrPt, CoCrTa, CoCrPtW, CoCrPtTa, CoCrPtB, CoCrPtTaB and CoCrPtTaNb which have an axis of easy magnetization substantially parallel to a film plane of said compensation layer on which said recording layer is provided.

4. The magnetic recording medium as claimed in claim 1, wherein said compensation layer and said recording layer form a bi-layer structure, and an arbitrary number of bi-layer structures are successively stacked on said non-magnetic underlayer.

5. A magnetic recording medium comprising:
   a non-magnetic underlayer; and
   a magnetic layer including a compensation layer provided on said non-magnetic underlayer, and a recording layer provided on said compensation layer,
   said compensation layer having a thickness of 3 to 15 nm, and being made of Co or a Co alloy with a Curie temperature of approximately 30 to 150° C.,
   said recording layer having a thickness of 10 to 30 nm, and being made of a Co alloy with a Curie temperature of approximately 250 to 800° C.,
   wherein a total magnetization of said magnetic layer as a whole decreases by approximately 10 to 25% over a temperature range of 0 to 100° C.

6. A magnetic recording medium comprising:
   a non-magnetic underlayer; and
   a magnetic layer including a first compensation layer provided on said non-magnetic underlayer, a second compensation layer provided on said first compensation layer, and a recording layer provided on said second compensation layer,
   said first compensation layer having a thickness of 1 to 5 nm, and being made of Co or a Co alloy with a Curie temperature of approximately 0 to 50° C.,
   said second compensation layer having a thickness of 3 to 15 nm, and being made of Co or a Co alloy with a Curie temperature of approximately 30 to 150° C.,
   said recording layer having a thickness of 10 to 30 nm, and being made of a Co alloy with a Curie temperature of approximately 250 to 800° C.

7. The magnetic recording medium as claimed in claim 6, wherein said first and second compensation layers are made of a material selected from a group consisting of CoCr, CoCrTa, CoCrPt, CoCrW, CoCrB, CoCrPtTa, CoCrPtB, CoCrPtW, CoCrPtTaB and CoCrPtTaNb which include 60 to 80 atomic percent of Co and 20 to 40 atomic percent of Cr or other elements.

8. The magnetic recording medium as claimed in claim 6, wherein said recording layer is made of a material selected from a group consisting of CoCr, CoCrPt, CoCrTa, CoCrPtW, CoCrPtTa, CoCrPtB, CoCrPtTaB and CoCrPtTaNb which have an axis of easy magnetization substantially parallel to a film plane of said second compensation layer on which said recording layer is provided.

9. The magnetic recording medium as claimed in claim 6, wherein said first and second compensation layers and said recording layer form a tri-layer structure, and an arbitrary number of tri-layer structures are successively stacked on said non-magnetic underlayer.

10. The magnetic recording medium as claimed in claim 6, wherein a total magnetization of said magnetic layer as a whole decreases by approximately 10 to 25% over a temperature range of 0 to 100° C.

11. A magnetic storage apparatus comprising:
    at least one magnetic recording medium having at least a non-magnetic underlayer, and a magnetic layer which includes a compensation layer provided on said non-magnetic underlayer and a recording layer provided on said compensation layer,
    said compensation layer having a thickness of 3 to 15 nm, and being made of Co or a Co alloy with a Curie temperature of approximately 30 to 150° C.,
    said recording layer having a thickness of 10 to 30 nm, and being made of a Co alloy with a Curie temperature of approximately 250 to 800° C.

12. A magnetic storage apparatus comprising:
    at least one magnetic recording medium having at least a non-magnetic underlayer, and a magnetic layer which includes a first compensation layer provided on said non-magnetic underlayer, a second compensation layer provided on said first compensation layer, and a recording layer provided on said second compensation layer,
    said first compensation layer having a thickness of 1 to 5 nm, and being made of Co or a Co alloy with a Curie temperature of approximately 0 to 50° C.,
    said second compensation layer having a thickness of 3 to 15 nm, and being made of Co or a Co alloy with a Curie temperature of approximately 30 to 150° C., said recording layer having a thickness of 10 to 30 nm, and being made of a Co alloy with a Curie temperature of approximately 250 to 800° C.

13. A magnetic recording medium comprising:

a non-magnetic underlayer; and a magnetic layer including a compensation layer provided on said non-magnetic underlayer, and a recording layer provided on said compensation layer, said compensation layer being made of Co or a Co alloy with a Curie temperature of approximately 30 to 150° C., said recording layer being made of a Co alloy with a Curie temperature of approximately 250 to 800° C.

14. The magnetic recording medium as claimed in claim 1, wherein said magnetic layer is made up of exchange decoupled grains.

15. The magnetic recording medium as claimed in claim 1, wherein said compensation layer and said recording layer are exchange coupled during the read-back process.

16. The magnetic storage apparatus as claimed in claim 11, wherein said magnetic layer is made up of exchange decoupled grains.

17. The magnetic storage apparatus as claimed in claim 11, wherein said compensation layer and said recording layer are exchange coupled during the read-back process.

* * * * *